United States Patent
Wolff et al.

(10) Patent No.: US 12,061,380 B2
(45) Date of Patent: Aug. 13, 2024

(54) METHOD FOR APPLYING A SURFACE PATTERN ON A SURFACE OF A SPECTACLE LENS SUBSTRATE AND SPECTACLE LENS SUBSTRATE WITH A SURFACE PATTERN

(71) Applicant: Carl Zeiss Vision International GmbH, Aalen (DE)

(72) Inventors: Christian Wolff, Aalen (DE); Florian Launay, Aalen (DE); Michael Krieger, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/592,775

(22) Filed: Mar. 1, 2024

(65) Prior Publication Data

US 2024/0201517 A1 Jun. 20, 2024

Related U.S. Application Data

(63) Continuation of application No. PCT/EP2022/070513, filed on Jul. 21, 2022.

(30) Foreign Application Priority Data

Sep. 10, 2021 (EP) .................... 21195938

(51) Int. Cl.
*G02C 7/02* (2006.01)
*B29D 11/00* (2006.01)
*G02C 7/06* (2006.01)

(52) U.S. Cl.
CPC ........ *G02C 7/022* (2013.01); *B29D 11/00432* (2013.01); *G02C 7/06* (2013.01); *G02C 2202/24* (2013.01)

(58) Field of Classification Search
CPC ...... G02C 7/022; G02C 7/06; G02C 2202/24; B29D 11/00432
(Continued)

(56) References Cited

U.S. PATENT DOCUMENTS 10,268,050 B2 4/2019 To et al.
2010/0141729 A1 6/2010 Petsch et al.
(Continued)

FOREIGN PATENT DOCUMENTS

EP 2 184 127 B1 8/2013
EP 3 812 142 A1 4/2021
(Continued)

OTHER PUBLICATIONS

Industrial Norm "Mineralölparaffine [mineral oil paraffin] (ISO 2207:1983)," Dec. 1983, English-language machine translation attached.
(Continued)

*Primary Examiner* — William R Alexander
(74) *Attorney, Agent, or Firm* — Tautz & Schuhmacher LLC; Georg Hasselmann

(57) ABSTRACT

A method for applying a surface pattern on a surface of a spectacle lens substrate includes the following steps: providing a spectacle lens substrate having a polymeric lens material, providing a composition containing a swelling agent, applying a pattern of the composition on the surface of the spectacle lens substrate, and allowing for diffusion of the swelling agent from the composition into the lens material. Moreover, a spectacle lens substrate has a polymeric lens material and exhibits a surface pattern on a surface of the spectacle lens substrate. The polymeric lens material includes a swelling agent at positions forming the surface pattern, and a spectacle lens substrate contains a polymeric lens material, wherein the spectacle lens substrate
(Continued)

exhibits a pattern of a composition containing a swelling agent applied on a surface of the spectacle lens substrate.

15 Claims, 8 Drawing Sheets

(58) Field of Classification Search
USPC .................................................. 351/159.41
See application file for complete search history.

(56) References Cited

U.S. PATENT DOCUMENTS

| | | | |
|---|---|---|---|
| 2014/0316521 A1* | 10/2014 | McLeod | G02C 7/027 351/159.69 |
| 2015/0277143 A1 | 10/2015 | Lippens et al. | |
| 2018/0162143 A1 | 6/2018 | Biskop | |
| 2018/0292754 A1* | 10/2018 | Kikuchi | G03F 7/2004 |
| 2021/0263497 A1* | 8/2021 | Neal | G02C 7/049 |
| 2021/0302759 A1* | 9/2021 | Hamanaka | G02C 7/022 |
| 2022/0242154 A1 | 8/2022 | Christmann et al. | |

FOREIGN PATENT DOCUMENTS

| | | |
|---|---|---|
| WO | 2010/084272 A1 | 7/2010 |
| WO | 2014/053716 A1 | 4/2014 |
| WO | 2019/206569 A1 | 10/2019 |
| WO | 2020/078964 A1 | 4/2020 |
| WO | 2020/099549 A1 | 5/2020 |

OTHER PUBLICATIONS

Jenkins et al., "Glossary of basic terms in polymer science," Pure and Applied Chemistry, vol. 68, No. 12, pp. 2287 to 2311, 1996.
Online dictionary entry for the term "chemical substance," IUPAC, Compendium of Chemical Terminology, 2nd ed. (the "Gold Book"). Compiled by A. D. McNaught and A. Wilkinson. Blackwell Scientific Publications, Oxford (1997). Online version (2019) created by S. J. Chalk. ISBN 0-9678550-9-8, last revised Feb. 24, 2014, available at the url https://goldbook.iupac.org/terms/view/C01039, last accessed Feb. 26, 2024.
Industrial Norm "Ophthalmic optics—Spectacle lenses—Vocabulary (ISO 13666:2019)," English version EN ISO 13666:2019, Dec. 2019.
Industrial Norm "Kunststoffe—Dynamische Differenzkalorimetrie [Plastics—Dynamic Differential Calorimetry] (DSC), (ISO 11357-2)," Aug. 2020, English-language machine translation attached.
Meille et al., "Definitions of terms relating to crystalline polymers (IUPAC Recommendations 2011)," Pure Appl. Chem., vol. 83, No. 10, pp. 1831 to 1871, Aug. 3, 2011.
European Search Report issued in EP 21 195 938.2, to which this application claims priority, mailed Mar. 3, 2022.
International Search Report issued in PCT/EP2022/070513, to which this application claims priority, mailed Oct. 4, 2022.
Written opinion issued in PCT/EP2022/070513, to which this application claims priority, mailed Oct. 4, 2022.
International Preliminary Report on Patentability issued in PCT/EP2022/070513, to which this application claims priority, mailed Nov. 28, 2023.
U.S. Appl. No. 18/592,714, filed Mar. 1, 2024, Florian Launay, Dominik Wiedemann, Christian Wolff.

\* cited by examiner

METHOD FOR APPLYING A SURFACE PATTERN ON A SURFACE OF A SPECTACLE LENS SUBSTRATE AND SPECTACLE LENS SUBSTRATE WITH A SURFACE PATTERN

CROSS REFERENCE TO RELATED APPLICATIONS

This application is a continuation application of international patent application PCT/EP2022/070513, filed Jul. 21, 2022, designating the United States and claiming priority from European application 21 195 938.2, filed Sep. 10, 2021, and the entire content of both applications is incorporated herein by reference.

TECHNICAL FIELD

The present disclosure relates to a method for applying a surface pattern on a surface of a spectacle lens substrate, a spectacle lens substrate comprising a polymeric lens material, and a spectacle lens substrate comprising a polymeric lens material and exhibiting a surface pattern on a surface of the spectacle lens substrate.

BACKGROUND

Spectacle lenses are marked for several reasons. For example, temporary markings on lens surfaces can be used to enable the alignment and the control of the alignment of finished lenses for subsequent treatment steps such as cutting or piercing. Permanent markings on lens surfaces can contain information regarding the manufacturer, a batch number or characteristics of optical elements, for example. Such permanent markings are usually invisible ("semi-visible") to the wearer of the marked lenses or during normal use of the lenses and can have correspondingly small dimensions.

EP 2 184 127 B1 which is regarded as the closest related art discloses a method for producing a permanent marking in an optical element which consists of a material that is transparent in the visible spectral region. A marking region of the optical element is irradiated with laser radiation in order to generate local, near-surface material changes in such a way that a mark of prescribable shape and size is generated. The laser radiation used has an operating wavelength in the region between 1.1 µm and 9.2 µm. The operating wavelength is chosen for which the material of the optical element exhibits a partial absorption with a transmittance between 60% and 98%. However, such a laser based method removes a part of the substrate material that can result in drawbacks such as material weakening. Moreover, specific laser equipment is required to carry out the method.

WO 2010/084 272 A1 discloses a method for printing on an ophthalmic glass that comprises forming a pattern by depositing a first photo-polymerizable ink on the surface of the ophthalmic glass, polymerizing the first ink using a UV-visible light source and making an over-print on at least a portion of the pattern using a second transparent ink. However, the disclosed method requires special inks as well as UV-light equipment.

WO 2014/053716 A1 discloses a method for printing an ink jet marking on a non-wetting surface for liquid ink. The method comprises the following steps: depositing a first layer of ink at a first speed to provide adhesion, and depositing a second layer at a second speed in order to make the marking visible.

US 2018/0162143 A1 discloses a method for printing an optical component, in particular an ophthalmic lens, by depositing droplets of printing ink side by side and one above the other in several consecutive printing steps by means of a print head. During at least one printing step, an identifier indicating at least one lens parameter is structurally integrated into the optical component.

The suggested printing methods are time consuming due to the at least two step procedures. Moreover, the methods rely on adding a material on the substrate surface and therefore the markings are located on the substrate surface only. This may lead to easy removability of the obtained markings.

EP 3 812 142 A1 suggest applying masking agents to modify the surface topography of spectacle lens substrates. Apart from markings, tinting, sometimes referred to as coloring, of spectacle lenses is used for several purposes such as filtering light at a certain wavelength or aesthetic aspects. Conventionally, tinted spectacle lenses are prepared by immersing the substrate in a bath comprising at least one dye at elevated temperature.

Beyond that, some spectacle lenses exhibit structured surfaces, for example, for slowing down the progression of myopia if such spectacle lenses are worn in front of an eye of a wearer. Such spectacle lenses are disclosed, for example, in WO 2019/206569 A1, U.S. Ser. No. 10/268,050 B2, WO 2020/099 549 A1, and WO 2020/078 964 A1.

SUMMARY

It is an objective of the present disclosure to provide an improved method for applying a surface pattern on a surface of a spectacle lens substrate comprising a polymeric lens material in an easily applicable and reproducible manner.

It is a further objective of the present disclosure to provide a spectacle lens substrate with an improved surface pattern.

The first objective is achieved by a method for applying a surface pattern on a surface of a polymeric spectacle lens substrate in which a swelling agent diffuses from the composition into the lens material such that the swelling agent swells the polymeric network of the lens material causing an increase in volume. The further objective is achieved by a spectacle lens substrate wherein the polymeric lens material comprises a swelling agent at positions forming the surface pattern.

Throughout this specification the following definitions apply:

The term "polymeric spectacle lens substrate" refers to a spectacle lens substrate
  comprising at least one thermosetting hard resin (ISO 13666:2019(E), section 3.3.3) and/or at least one thermoplastic hard resin (ISO 13666:2019(E), section 3.3.4) or
  consisting of at least one thermosetting hard resin and/or at least one thermoplastic hard resin.

The term "accelerating agent" refers to a substance which can be employed for widening the polymeric network of a thermosetting hard resin, i.e., a polymer that is irreversibly hardened by curing, or for widening the polymeric network of a thermoplastic hard resin, i.e., a plastic material can repeatedly softened by heating and hardened by cooling. The widening of the polymeric network may enhance the uptake of the swelling agent.

The term "ametropia" refers to a refractive error causing issues with focusing light accurately on the retina of an eye due to the shape of the eye. Most common types of ametropia comprise myopia, hyperopia, astigmatism, and presbyopia (ISO 13666:2019(E), section 3.1.14).

The term "as-worn position" is the position, including orientation, of the spectacle lenses relative to the eyes and face during wear (ISO 13666:2019 (E), section 3.2.36). The as-worn position is determined by the as-worn pantoscopic angle, the as-worn face form angle and the vertex distance. The as-worn pantoscopic angle is the vertical angle between the horizontal and the perpendicular to a reference line passing through the apex of the grooves of the upper and lower rims of the frame in the vertical plane containing the primary direction (ISO 13666:2019(E), section 3.2.37), where the primary direction is the direction of the line of sight, usually taken to be the horizontal, to an object at an infinite distance measured with habitual head and body posture when looking straight ahead in unaided vision (ISO 13666:2019(E), section 3.2.25) and the line of sight is the ray path from the point of interest (i.e. point of fixation) in object space to the centre of the entrance pupil of the eye and its continuation in image space from the centre of the exit pupil to the retinal point of fixation (generally the foveola) (ISO 13666:2019(E), section 3.2.24). Typical values of the as-worn pantoscopic angle lie in the range between −20 and +30 degree. The as-worn face form angle is the horizontal angle between the primary direction and the perpendicular to a reference line passing through the apex of the grooves of the nasal and temporal rims of the frame in the horizontal plane containing the primary direction (ISO 13666:2019(E), section 3.2.38). Typical values of the as-worn face form angle lie in the range between −5 and +30 degree. The vertex distance is the horizontal distance between the back surface of the spectacle lens and the apex of the cornea, measured with the eyes in the primary position (ISO 13666:2019(E), section 3.2.40), where the primary position is the position of the eye when looking in the primary direction (ISO 13666:2019(E), section 3.2.26). Typical values of the vertex distance lie in the range between 5 mm and 30 mm. The as-worn position may be an individual as-worn position determined for a specific individual or a generic as-worn position determined for a defined group of wearers.

The term "composition" refers to either a single material or a mixture such as a solution, dispersion etc. of two or more different materials. With regard to the present disclosure the composition at least comprises a swelling agent. The composition may consist of the swelling agent or it may comprise other materials apart from the swelling agent such as one or more accelerating agents.

The term "congealing point" refers to the highest temperature at which a liquid or a melted solid solidifies. For petroleum waxes, e.g., the waxes mentioned in this specification, it can be determined according to DIN ISO 2207: 1983-12.

The term "diffusion" refers to the physical process of spreading through or into a surrounding material by mixing with it. Diffusion can be regarded as the net movement of molecules from a region of higher concentration to a region of lower concentration. Diffusion is driven by a gradient in concentration. The rate of diffusion is dependent on the temperature and the combination of materials, e.g., diffusion of species A in B has a specific temperature dependent diffusion rate.

The terms "direct" and "directly" in the context of deposition or application of a composition to a surface means that the composition is deposited on or applied to the surface without any other materials, for instance in form of layers, in between the surface and the composition.

The term "glass transition temperature" refers to the temperature below which completely or partially amorphous polymers are in a glassy or hard-elastic, brittle state and above which they are in a highly viscous or rubber-elastic, flexible state. According to the IUPAC (Meille Stefano, V.; Allegra, G.; Geil Phillip, H.; He, J.; Hess, M.; Jin, J.-I.; Kratochvíl, P.; Mormann, W.; Stepto, R. (2011). "Definitions of terms relating to crystalline polymers (IUPAC Recommendations 2011)". Pure Appl. Chem. 83 (10): 1831. doi: 10.1351/PAC-REC-10-11-13) the glass transition temperature is the temperature at which the glass transition occurs, i.e., at which a polymer melt changes on cooling to a polymer glass or a polymer glass changes on heating to a polymer melt. The glass transition temperature can be determined by Differential Scanning Calorimetry (ISO 11357-2: 2020(E)). The term "glass transition temperature" as used within this disclosure refers to the onset of the glass transition temperature which is the temperature at which the glass transition starts. It can be determined by extrapolation of the related Differential Scanning Calorimetry curve.

The term "heating" refers to a method for increasing a temperature by the input of energy.

The term "inkjet printing" refers to a non-contact method of creating a pattern on a surface by discrete deposition of ink droplets. The term "ink" refers to any composition regardless of its color that can be deposited droplet by droplet. To enable or facilitate the formation and deposition of droplets it might be required to heat the ink to a certain temperature. Common procedures for inkjet printing include the continuous inkjet method and the drop-on-demand method, both well known to the person skilled in the art.

The term "lenslet" refers to an optical element in form of a microlens. Several lenslets can be arranged in the same plane forming a lenslet array. The lenslet may provide an additional focal power, i.e., a focal power that is added to the focal power (ISO 13666:2019(E), section 3.10.2) of a spectacle lens. The focal power of the spectacle lens may provide, assisted by accommodation, a focused image on the fovea and the additional focal power may, when added to the focal power of the spectacle lens, provide for a myopic defocus if the lenslet is used for at least retarding myopia.

The term "lens material" refers to the optical material (ISO 13666:2019(E), section 3.3.1) of the spectacle lens substrate. The spectacle lens substrate may comprise the lens material or consist of the lens material. Typically the optical material comprises at least one thermosetting hard resin and/or at least one thermoplastic hard resin.

The term "locally resolved" means that different properties can be achieved with regard to the lateral dimensions of the surface of the spectacle lens substrate.

The term "myopia" refers to an eye disorder where light focuses in front of, instead on, the retina.

The term "optical element" refers to an optically effective element, e.g., a lens.

The term "pattern" refers to one or more macroscopic elements, for example a number, a letter of any type of graphic, a graphic representation such as a dot, symbol etc. A pattern used in the exemplary embodiments is the lettering "MARK." A surface pattern is a pattern caused by
- height differences within the surface of the spectacle lens substrate,
- at least one lenslet, typically a plurality of lenslet, on at least one surface of the spectacle lens substrate.

The terms "polymer" and "polymeric" refer to natural of synthetic substances composed of macromolecules composed of many repeating subunits. They comprise homopolymers and copolymers, such as graft polymers.

The term "polymerizable" describes the ability of a certain substance to be polymerized.

The terms "polymerize" and "polymerizing" refer to a polymerization process, i.e., a process of converting a monomer or a mixture of monomers into a polymer according to Jenkins, A. D.; Kratochvíl, P.; Stepto, R. F. T.; Suter, U. W. (1996). "Glossary of basic terms in polymer science (IUPAC Recommendations 1996)" (PDF). Pure and Applied Chemistry. 68 (12): 2287-2311. doi:10.1351/pac199668122287.

The term "spectacle lens" refers to an ophthalmic lens worn in front of, but not in contact with, the eyeball (ISO 13666:2019(E), section 3.5.2), where an ophthalmic lens is a lens intended to be used for purposes of measurement, correction and/or protection of the eye, or for changing its appearance (ISO 13666:2019(E), section 3.5.1).

The term "spectacle lens substrate" refers to a piece of optical material that is used during the manufacturing process of a spectacle lens, i.e., precursors of a finished lens (ISO 13666:2019(E), section 3.8.7), an uncut lens (ISO 13666:2019(E), section 3.8.8) or an edged lens (ISO 13666:2019(E), section 3.8.9). Suitable precursors of the finished lens are for example semi-finished lens blanks, wherein the term "semi-finished lens blank" refers to a piece of optical material with one optically finished surface for the making of a spectacle lens (ISO 13666:2019(E), section 3.8.1). In any case, the spectacle lens substrate as used herein exhibits at least one surface without any coatings such as AR (anti-reflective)- or HC (hard coat)-coatings which is to be used in the method described herein.

The term "stearamide wax" means Octadecanamide, CAS 124-26-5.

The term "substance" refers to a chemical substance which is a form of matter having a constant chemical composition and characteristic properties (IUPAC. Compendium of Chemical Terminology, 2nd ed. (the "Gold Book"). Compiled by A. D. McNaught and A. Wilkinson. Blackwell Scientific Publications, Oxford (1997). Online version (2019) created by S. J. Chalk. ISBN 0-9678550-9-8. doi.org/10.1351/goldbook).

The term "surface" refers to any layer or surface of the three-dimensional spectacle lens substrate or spectacle lens that is in direct contact with the environment. The surface can be regarded as its boundary. The surfaces of a spectacle lens substrate include its front surface, i.e., frontside, side surface, i.e., edge, and back surface, i.e., backside.

In the context of a spectacle lens the expression "front surface" is used for a surface of a spectacle lens which when mounted and worn in the frame faces away from the wearer's eye (ISO 13666:2019(E), section 3.8.13). In the context of a semi-finished lens blank, the expression "front surface" is used for a surface which will eventually become the front surface of a spectacle lens that is manufactured from the semi-finished lens blank. The curvature of a section of the front surface of a semi-finished lens blank which is used as a starting object from which a spectacle lens is manufactured may already resemble the curvature of the spectacle lens to be manufactured.

In the context of a spectacle lens the expression "back surface" is used for a surface of a spectacle lens which when mounted and worn in the spectacle frame faces towards the wearer's eye (ISO 13666:2019(E), section 3.8.14). In the context of a semi-finished lens blank, the expression "back surface" is used for a surface which will eventually become the back surface of a spectacle lens that is manufactured from the semi-finished lens blank. The back surface of a semi-finished lens blank may be machined during the manufacturing process of a spectacle lens.

The term "swelling agent" refers to a substance which diffuses into the lens material and swells the polymeric network of the lens material causing an increase in volume. The swelling may lead to height differences within the surface of the spectacle lens substrate. It may also lead to different mechanical and optical properties within the affected surface-volume segment.

The articles "a," "an," and "the" as used in this specification and the appended claims include plural referents unless expressly and unequivocally limited to one referent.

The term "and/or" as used herein, when used in a series of two or more elements, means that any of the listed elements may be used alone, or any combination of two or more of the listed elements may be used. For example, when describing the usage of methods A, B, and/or C, method A alone; B alone; C alone; A and B in combination; A and C in combination; B and C in combination; or A, B, and C in combination may be used.

In a first aspect, the disclosure provides a method for applying a surface pattern on a surface of a spectacle lens substrate. The method comprises the following steps: providing a spectacle lens substrate comprising a polymeric lens material, providing a composition comprising a swelling agent, applying a pattern of the composition on the surface of the spectacle lens substrate and allowing for diffusion of the swelling agent from the composition into the lens material.

Optionally, the step of allowing for diffusion of the swelling agent from the composition into the lens material may comprise heating the spectacle lens substrate, i.e., the spectacle lens substrate is heated to allow for diffusion of the swelling agent from the composition into the lens material.

Thereafter, the composition can be removed from the surface of the spectacle lens substrate. The method may further comprise applying a coating on the surface of the spectacle lens substrate after removal of the composition, for instance an AR (anti-reflective, ISO 13666:2019(E), section 3.18.3)- and/or a HC (hard coat, ISO 13666:2019(E), section 3.18.2)-coating.

The method employs diffusion of molecules of a swelling agent from the composition into the lens material to obtain the surface pattern. The diffusion may be accelerated by heating of the spectacle lens substrate. Since the composition is applied as a pattern on the substrate surface, a locally resolved surface pattern is obtained. The applied pattern of the composition corresponds to the surface pattern to be applied on the surface of the spectacle lens substrate.

Typically, the transfer of the swelling agent occurs by diffusion only. This enables a good control of the transfer process.

To allow for proper diffusion, the process temperature should be selected properly. As different materials with different properties may be combined within the scope of the disclosure it is not possible to indicate a certain temperature that can be used for all material combinations. Still, the skilled person will be able to determine a suitable temperature considering the following restrictions.

The temperature should be below the congealing point of the composition to avoid spreading of the melted composition on the substrate surface. This avoids distortion of the applied pattern due to gravity and deterioration of resolution caused thereby, i.e., a high spatial resolution with high reproducibility can be obtained.

Moreover, the temperature should be above the glass transition temperature of the lens material. This enables sufficiently fast diffusion of the swelling agent due to the soft state of the lens material while maintaining the physical dimensions of the substrate. The swelling process might be accelerated as well if the temperature is above the glass transition temperature of the lens material.

Apart from these constraints, the temperature can typically be high enough that the mobility of the swelling agent molecules enables a processing within the range of few seconds to about 7 days. This allows for reasonable production times. More typically, the temperature can be chosen in a way that diffusion of the swelling agent into the lens material is magnitudes larger than diffusion of the very same swelling agent within the lens material. This avoids deterioration of resolution and thus a substrate with a locally resolved surface pattern with high resolution can be obtained.

Typically, the rate of the swelling process should be above the diffusion rate of the diffusion of the swelling agent within the lens material. This may enhance the spatial resolution of the surface pattern to be created.

polyimide, polysulfone, copolymers of poly(ethylene terephthalate) and polycarbonate, polyolefins, polymers and copolymers of diethylene glycol bis(allyl carbonate), (meth) acrylic polymers and copolymers and epoxy polymers and copolymers. The refractive index of the lens material can be for example 1.50, 1.60 or 1.67. Specific examples for suitable lens materials are poly(allyl diglycol carbonate) (CR-39) with a refractive index of 1.50 and poly(thiourethane) with a refractive index of 1.60 (MR-8) or 1.67 (MR-7).

Suitable examples of swelling agents can be organic solvents, organic dyes and waxes, for instance stearamide wax (CAS identifier 124-26-5), paraffin waxes and hydrocarbon waxes (CAS identifier 8002-74-2), oxidized Fischer-Tropsch waxes, and polyethylene waxes (CAS identifier 9002-88-4). Specific examples of suitable swelling agents from the manufacturer Deurex AG are shown with material properties in Tables 1.

TABLE 1

Material properties of suitable swelling agents.

| Product name | Type | Drop point [° C.] | Acid value [mg KOH/g] | Viscosity 140° C. [mPas] | Congealing point [° C.] | CAS identifier |
| --- | --- | --- | --- | --- | --- | --- |
| A 28 P | Stearamide | 101-111 | 5 | 7-12 | 98-102 | 124-26-5 |
| T 39 A | Fischer-Tropsch | 110-120 | 0 | ≤20 | 100 | 8002-74-2 |
| T 39 B | Fischer-Tropsch | 110-118 | 0 | ≤20 | 100 | 8002-74-2 |
| TO 80 G | Oxidized Fischer-Tropsch | 115-120 | 2-4 | ≤20 | 96-100 | Chemical identity: Hydrocarbon waxes, oxidized REACH: Complies with regulation (EG) Nr. 1907/2006 |
| TO 8120 M | Oxidized Fischer-Tropsch | 113-118 | 5 | ≤20 | 96-100 | Chemical identity: Hydrocarbon waxes, oxidized REACH: Complies with regulation (EG) Nr. 1907/2006 |
| E 09 K | Non-polar polyethylene wax | 110-120 | 0 | ≤40 | | 9002-88-4 |

Heating the spectacle lens substrate means that the temperature relevant for the occurrence of the above-mentioned processes is reached for sufficient time at least within the relevant areas of the spectacle lens substrate which should be patterned. The heating could be regarded as tempering. The heating might be carried out before and/or after applying the pattern of the composition, for example using an oven. The heating may comprise the whole spectacle lens substrate or only a part of it. The heating might be even carried out by applying a heated composition so that the applied heated composition leads to heating of the spectacle lens substrate. The heating accelerates the diffusion of the swelling agent into the lens material. Moreover, the heating can also accelerate the swelling of the lens material.

Lens materials which can be used in the context of the disclosure are lens materials conventionally used in optics and in ophthalmology. Suitable lens materials are for example of the following types: polycarbonate, polyamide, The specific choice of the swelling agent depends on the lens material which has to be swelled as the swelling agent must be able to swell the chosen lens material. Moreover, the choice of the swelling agent depends on the required durability of the surface pattern to be applied on the surface of the spectacle lens substrate. If a swelling agent with a high diffusion rate for the diffusion out of the surface of the spectacle lens substrate after heating is chosen a non-permanent surface pattern with rather short durability is obtained. In contrast, if a swelling agent with a low diffusion rate for the diffusion out of the surface of the spectacle lens substrate after heating is chosen a longer lasting surface pattern is obtained. Thus, the method is usable for both, permanent and non-permanent patterning depending on, among other things, the selection of the swelling agent.

The usability of a certain swelling agent can be verified within the framework of simple experiments wherein a certain substance chosen to be used as swelling agent is applied on a surface of the chosen lens material. After heating, a swelling of the lens material should be observable if the substance is a suitable swelling agent.

The composition may consist of the swelling agent or comprise further substances, e.g., coloring additives for obtaining colored patterns. The congealing point of the composition comprising the swelling agent should be above the glass transition temperature of the lens material. Moreover, the composition should be easily removable from the surface of the spectacle lens substrate without damaging the substrate. Typically, the composition should be non-toxic and environmentally friendly to facilitate the handling of the composition as well as the disposal of used or excess composition.

Typically, the pattern of the composition can be directly applied on the surface of the spectacle lens substrate. Auxiliary layers such as primer layers are not needed. Thus, the method is easily applicable and cost-effective to implement.

The method allows for applying a surface pattern on the surface of a spectacle lens substrate in an easily applicable manner with high reproducibility. Depending on the chosen materials and process parameters, either permanent or non-permanent surface patterns can be obtained.

If a colorless swelling agent is used the obtained surface pattern is transparent and semi-visible by the eye. In contrast, if the used composition contains a coloring agent the obtained pattern is colorful thus allowing for easier recognition if needed.

As the swelling leads to height differences within the surface of the spectacle lens substrate, the pattern cannot only be seen but also felt when touched. Thus, the pattern can also be recognized by persons with limited eyesight by eyesight by haptic recognition. The pattern can also be used for decorative effects, for example employing the AR coating as the interference layer looks different when there is a pattern with small bumps under it, i.e., the appearance is angle dependent. This can be of particular interest for tinted sunglasses with or without correcting power, for instance made from CR-39 as lens material.

In a specific development of the inventive method, the method comprises applying an accelerating agent on the surface of the spectacle lens substrate. Suitable examples of accelerating agents are chloroform (CAS 67-66-3) and aromatic alcohols such as, for example, benzyl alcohol (CAS 100-51-6).

The specific choice of the accelerating agent depends on the lens material whose polymeric network should be widened by the accelerating agent. The usability of a certain accelerating agent can be verified within the framework of simple experiments wherein a certain substance chosen to be used as accelerating agent is applied on a surface of the chosen lens material. For 1.60 and 1.67 lenses (MR-7 and MR-8) benzyl alcohol can be used as accelerating agent.

The use of an accelerating agent may enhance the diffusion rate of the swelling agent into the lens material leading to shorter production times for applying the surface pattern on the spectacle lens substrate.

In a further specific development of the inventive method, the method employs a polymerizable swelling agent. Thus, the method can comprise polymerizing the polymerizable swelling agent.

Examples for polymerizable swelling agents are swelling agents based on polymerizable thiophene structures. Besides thiophenes, other monomers that do not undergo polymerization at the heating temperature can be used.

Specifically, the swelling agent can be UV curable, i.e., polymerizable by irradiation with UV (ultraviolet) light. UV curing has the advantage of fast reaction times and requires UV light equipment only. In addition, the polymerization process can be controlled very well. Heating, as required for radical polymerization for example and which might be detrimental for the spectacle lens substrate, is not needed.

If the swelling agent is polymerized a permanent swelling of the spectacle lens substrate can be obtained as the polymerized swelling agent may not diffuse out of the spectacle lens substrate again. Thus, permanent surface patterns on the surface of the spectacle lens substrate can be obtained.

The polymerization of the polymerizable swelling agent can be carried out simultaneously with the heating of the spectacle lens substrate, after removing the composition from the surface of the spectacle lens substrate or simultaneously with applying a coating on the spectacle lens substrate after removing the composition from the surface of the spectacle lens substrate.

If the polymerization is carried out during the heating of the spectacle lens substrate an additional method step for polymerization can be avoided and hence the overall method can be performed quickly. If the polymerization is carried out after removing the composition from the surface of the spectacle lens substrate polymerization of excessive swelling agent in the composition can be avoided. Thus, the removal of the composition from the surface of the spectacle lens substrate is simplified. If the polymerization is carried out at an ever later stage, i.e., simultaneously with applying a coating on the spectacle lens substrate after removing the composition from the surface of the spectacle lens substrate, the above advantages can be combined—an additional method step for polymerization can be avoided and the removal of the composition from the surface of the spectacle lens substrate is simplified.

Typically, the pattern can be applied by inkjet printing. Inkjet printing allows the application of the pattern on the substrate surface with high resolution and reproducibility. Moreover, the amount of swelling agent per unit area of the lens material can be easily pre-defined by selecting proper printing amounts (size of printing droplets, amount of printing passes, etc.). Thus, by selecting the printing features, the final look of the patterned spectacle lens substrate can exactly be determined even before the heating step. Moreover, inkjet printing can be easily automated.

In a further specific development, the pattern is applied and heated such that the obtained surface pattern comprises optical elements for a treatment of ametropia, e.g., myopia, hyperopia, astigmatism. The optical elements can be positioned on the surface of the spectacle lens substrate such that the ametropia is treated if a spectacle lens manufactured from the spectacle lens substrate is positioned relative to the eye of a wearer according to a given as-worn position.

By swelling certain areas of the surface of the spectacle lens substrate its morphology and physical properties, like refractive index, are modified. As a result, characteristics like the refractive power of these areas are changed. The use of swelling for creating optical elements is easily applicable. Moreover, the creation and arrangement of the optical elements is customizable on individual requirements as the surface pattern can easily be changed from one spectacle lens substrate to the next, especially if applying the composition by inkjet printing.

For example, the optical elements can comprise lenslets which are designed and arranged on the surface of the spectacle lens substrate for at least retarding progression of myopia if a spectacle lens manufactured from the spectacle lens substrate is positioned relative to the eye of a wearer according to a given as-worn position.

Myopia is an ametropia that is very common especially among younger people. Thus, spectacle lenses for at least retarding the progression of myopia are of great importance. Such spectacle lenses may, for example, comprise lenslets as disclosed, for example, in WO 2019/206569 A1, U.S. Ser. No. 10/268,050 B2, and WO 2020/099549 A1. However, the production of such lenslets is rather difficult employing molding or machining processes. The use of the method presented above for creating such lenslets may facilitate the production of such spectacle lenses as no specific molds or machining equipment is needed. Instead, it can be sufficient to apply and heat the composition on the surface of the spectacle lens substrate for obtaining such lenslets. Moreover, the lenslet can be individually configured and positioned in an easily applicable manner.

According to a further aspect of the disclosure, a spectacle lens substrate comprising a polymeric lens material and exhibiting a surface pattern on a surface of the spectacle lens substrate is provided. The polymeric lens material comprises a swelling agent at positions forming the surface pattern.

The swelling agent leads to swelling of the lens material at positions where it is present thereby forming the surface pattern. This patterned spectacle lens substrate is obtainable by any one of the methods for applying a surface pattern on a surface of a spectacle lens substrate as described above. Concerning the properties and selection of a suitable materials and method steps as well as their advantages, reference is made to the above explanations describing the method for applying a surface pattern on a surface of a spectacle lens substrate.

In a specific development, the swelling agent is polymerized.

In a further specific exemplary embodiment, the swelling agent is at least one selected from the group described in Table 1.

In a further specific exemplary embodiment, the surface pattern comprises optical elements for a treatment of ametropia. For example, the optical elements can comprise lenslets which are designed and arranged on the surface of the spectacle lens substrate for at least retarding progression of myopia if a spectacle lens manufactured from the spectacle lens substrate is positioned relative to the eye of a wearer according to a given as-worn position.

According to a further aspect of the disclosure, a spectacle lens substrate comprising a polymeric lens material is provided. The spectacle lens substrate exhibits a pattern of a composition comprising a swelling agent applied on a surface of the spectacle lens substrate.

This spectacle lens substrate can be regarded as a precursor of the spectacle lens substrate with a surface pattern obtainable by any one of the methods for applying a surface pattern on a surface of a spectacle lens substrate described above.

Concerning the properties and selection of suitable materials and methods for applying the pattern as well as their advantages, reference is made to the above explanations describing the method for applying a surface pattern on a surface of a spectacle lens substrate.

BRIEF DESCRIPTION OF THE DRAWINGS

Further features, properties and advantages of the present disclosure will become clear from the following description of exemplary embodiments in conjunction with the accompanying drawings.

DESCRIPTION OF EXEMPLARY EMBODIMENTS

Figure 1A:
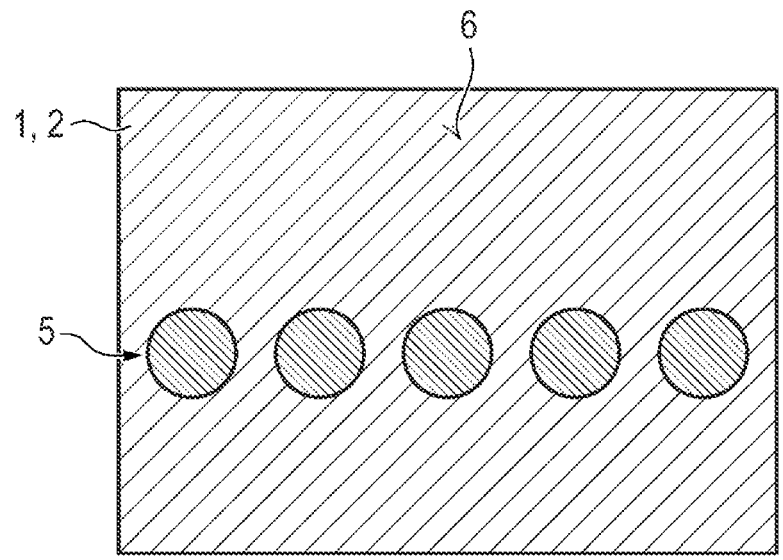
FIG. 1A shows a spectacle lens substrate with a surface pattern according to the related art in a top view.

Each of the methods 100 for applying a surface pattern 5 on a surface 6 of a spectacle lens substrate 1 described herein allows the modification of spectacle lens substrates by locally resolved swelling, temporary or permanently. The methods 100 can be used for a variety of different polymeric spectacle lens substrates 1, for example with refractive indices of 1.50, 1.60, and 1.67, as well as a variety of swelling agents 4. In addition to this, minimal efforts are needed for implementation into lens production as many process parameters are known from standard procedures and the machines needed, e.g., inkjet printing devices, ovens, are readily available.

Among others, the following applications can be realized by using the suggested methods 100 for applying a surface pattern 5 on a surface 6 of a spectacle lens substrate 1:

Customer samples distributed to opticians with corporate identity markers (characters, logo, etc.) as surface pattern 5.

Productive customer orders (including "clear lenses") can be customized by surface patterns 5.

Lens identification: The surface patterns 5 can be recognized by OCR (optical character recognition) software, enabling the processes to be used for applying lens identification data as surface pattern 5 to the spectacle lens substrate 1.

The surface patterns 5 can be used as anti-falsification markings.

The surface patterns 5 may comprise optical elements such as lenslets for a treatment of ametropia.

The spectacle lens substrates 1 can be patterned on one side only, e.g., front surface or back surface, or both sides, e.g., front and back surface. Any type of spectacle lens substrates 1, e.g., pucks, edged, etc., without HC/AR-coating can be used. The method 100 can be performed in a fully automated way, especially, if inkjet printing is used for applying the pattern 7 on the surface 6 of the spectacle lens substrate 1. Compared to traditional laser engraving, no lens material 2 is removed and the surface pattern 5 can be made "see-through."

Figure 1B:
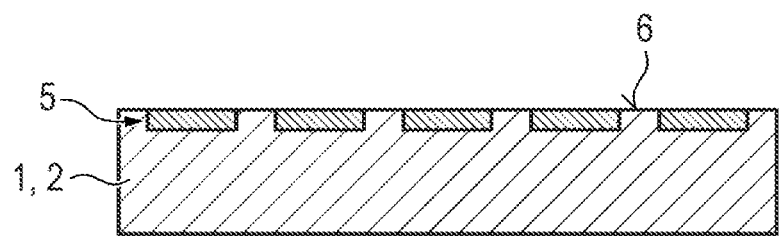
FIG. 1B shows the spectacle lens substrate of FIG. 1A in a cut view.

FIGS. 1A and 1B depict a spectacle lens substrate 1 comprising a polymeric lens material 2 and exhibiting a surface pattern 5 on its surface 6 according to the related art in top view and cut view, respectively. The surface pattern 5 represented by the dots was created by laser radiation, i.e., the surface 6 was irradiated locally-resolved with a laser ("laser shot"). This led to the partial removal of the lens material 2 in the irradiated areas.

Drawbacks of this procedure are, inter alia, the need for specific laser equipment and possible material weakening due to the removal of the lens material 2.

Figure 2A:
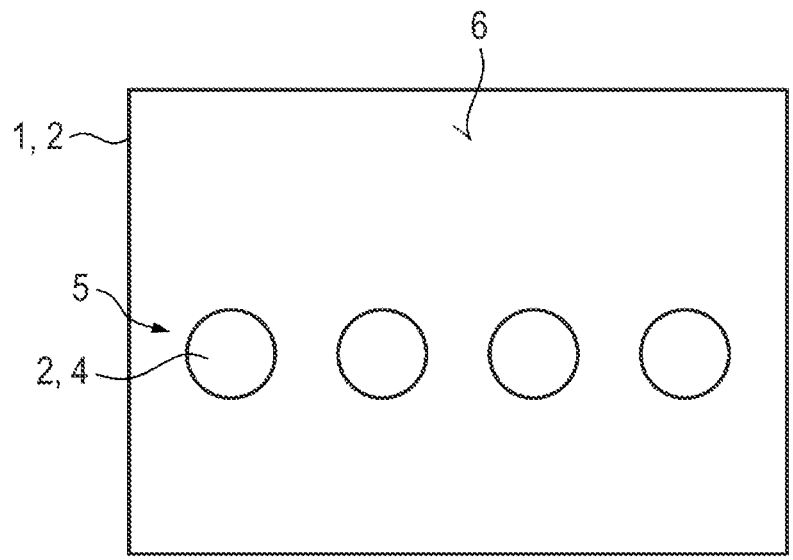
FIG. 2A shows an exemplary embodiment of a spectacle lens substrate with a surface pattern in a top view.
Figure 2B:
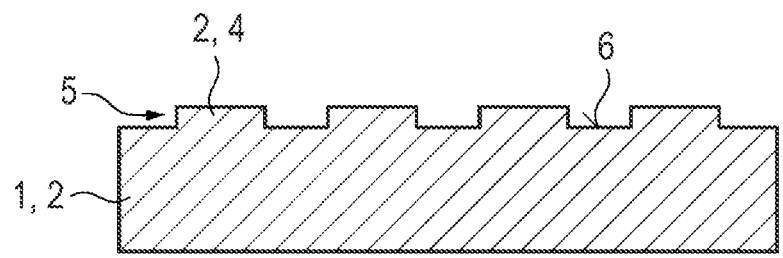
FIG. 2B shows the exemplary embodiment of FIG. 2A in a cut view.

To overcome these drawbacks, the present disclosures makes use of a swelling approach, i.e., the locally-resolved swelling of the lens material 2 to obtain a surface structure 5. This general approach is depicted in FIGS. 2A and 2B. As in the related art, the spectacle lens substrate 1 comprises a polymeric lens material 2. However, the lens material 2 comprises a swelling agent, for example a stearamide wax, at the positions that form the surface structure 5.

Due to the incorporation of the swelling agent 4, the lens material 2 was swollen in a locally-resolved manner causing a volume increase of the swollen parts of the surface 6, i.e., the positions forming the surface pattern 5. The obtained surface pattern 5 is "see through" and semi-visible by eye.

Depending on the required surface pattern 5 and its durability, the swelling agent 4 may be polymerized. If the swelling agent 4 is polymerized, a permanent surface pattern 5 may be obtained. Otherwise, the durability of the surface pattern 5 may be decreased, i.e., a non-permanent surface pattern 5 may be formed.

The inventive surface pattern 5 may be obtained by a method 100 for applying a surface pattern 5 on a surface 6 of a spectacle lens substrate 1 as described hereinafter with respect to FIGS. 3 and 4.

Figure 3:
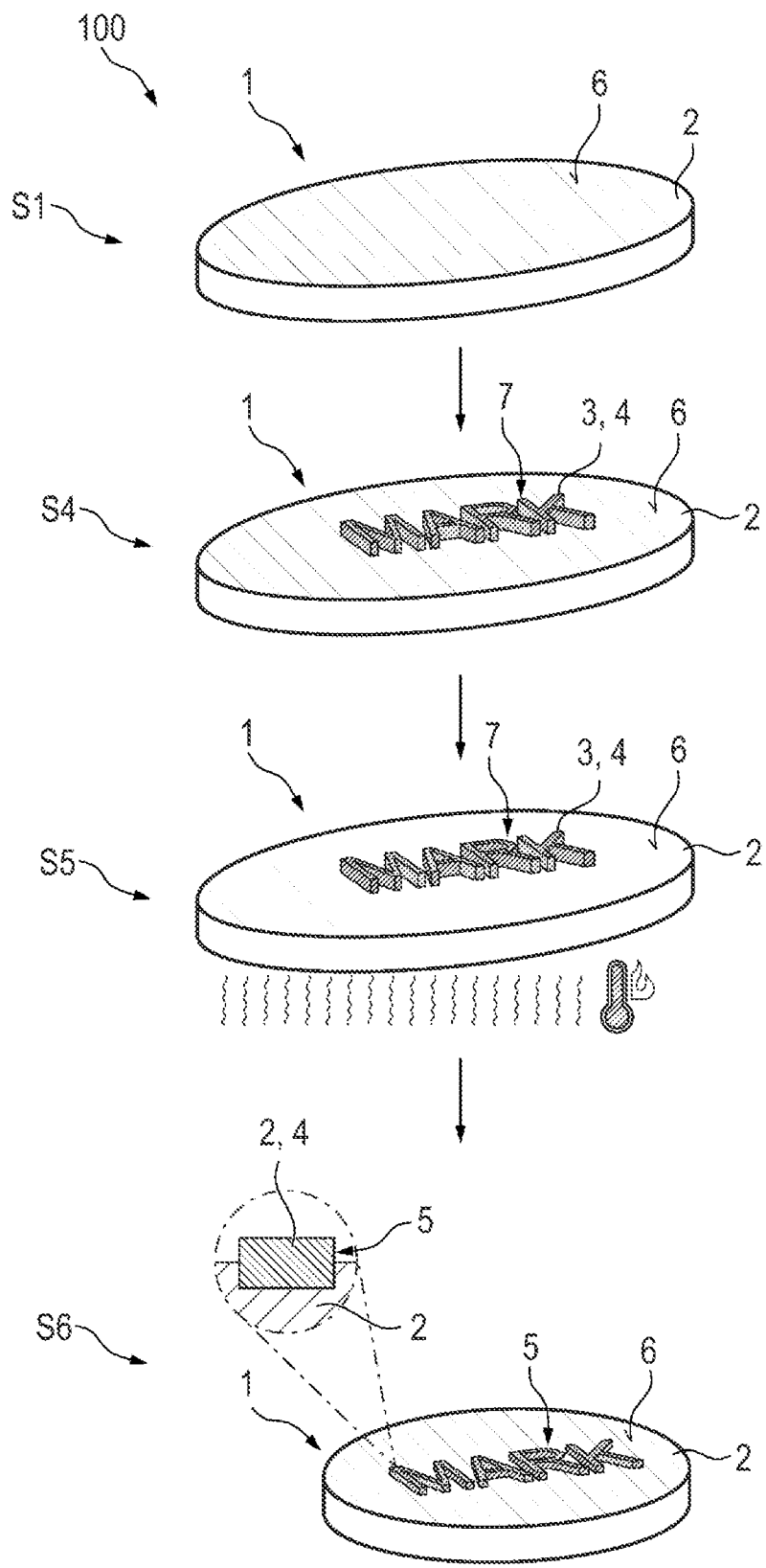
FIG. 3 illustrates an exemplary embodiment of a method for applying a surface pattern on a surface of a spectacle lens substrate.

FIG. 3 illustrates an exemplary embodiment of a method 100 for applying a surface pattern 5 on a surface 6 of a spectacle lens substrate 1.

In step S1, a spectacle lens substrate 1 is provided. The spectacle lens substrate 1 comprises a polymeric lens material 2. In a specific example, the lens material 2 is poly(allyl diglycol carbonate) or poly(thiourethane) with refractive indices of 1.50, 1.60 or 1.67. Method 100 does not require any specific coating or material on the surface 6 of the spectacle lens substrate 1. However, the surface 6 might be cleaned prior to the next steps by common cleaning methods.

Moreover, an accelerating agent can be applied on the surface 6 of the spectacle lens substrate 1, for example by immersing the whole spectacle lens substrate 1 in a bath comprising an accelerating agent or consisting of an accelerating agent (step S3, not depicted in FIG. 3). Possible accelerating agents are water, for example for the use with poly(allyl diglycol carbonate), and benzylic alcohol, for example for the use with poly(thiourethane). The accelerating agent facilitates the diffusion of the swelling agent 4 into the spectacle lens substrate 1.

In step S4, a pattern 7 that is depicted with the letters "MARK" of a composition 3 is applied on the surface 6 of the spectacle lens substrate 1. The composition 3 is provided in step S2 (see FIG. 4) and comprises a swelling agent 4. In the specific example, the swelling agent 4 is stearamide wax, for example, Deurex A 28 P from the manufacturer Deurex AG.

The congealing point Tc (composition) of the composition 3 is above the glass transition temperature Tg (lens) of the lens material 2.

The pattern 7 can be applied by inkjet printing. In a specific example, an X-Cube digital lens inking device from the manufacturer Tecoptique was used for inkjet printing. This device allows to print patterns 7 on any type of spectacle lens substrates. However, other printing devices could be used as well. The X-Cube device can either be used in a manual mode or an automatic mode allowing for automating of the method 100.

The X-Cube device was used with a M-series industrial piezo carrier jet printhead manufactured by Xerox, corp. (Xerox M1). This print head is ideal for high demand application and can jet fluids within a temperature range from ambient to 140° C. The characteristics of the print head can be found in Table 2.

TABLE 2

M-series print head characteristics.

| Operating Parameters | Unit of Measure | Xerox M-Series |
| --- | --- | --- |
| Number of addressable jets | | 880 |
| 4 Colour (closest) nozzles spacing | microns (dpi) | 337.5 (75) |
| Single colour nozzle spacing | microns (dpi) | 84.4 (300) |
| Rows of nozzles | | 16 |
| Meniscus pressure | mbar | −3 to −8 |
| Drop size | picoliters | 15 to 30 |
| Nominal drop velocity | m/s | up to 10 |
| Operating temperature max | ° C. | 140 |
| Fluid viscosity | cP | 6 to 11 |
| Maximum operating frequency | kHz | 43 kHz |

The printing distance, i.e., the distance between the surface 6 and the print head was chosen between 0.5 to 3 mm, the printing resolution was 900 dpi with 3 printing passes. However, the printing resolution as well as the amount of printing passes can be varied, e.g., between 25 to 1200 dpi and 1 to 10 passes, respectively. The printing temperature was between 120° C. to 140° C.

Referring again to FIG. 3, method 100 continues with step S5 wherein the swelling agent 4 diffuses from the composition 3 into the lens material 2. The diffusion process is optionally facilitated by heating the spectacle lens substrate 1 to a temperature above the glass transition temperature Tg (lens) of the lens material 2 and below the congealing point Tc (composition) of the composition 3 with a heating device, for example in an air oven. The spectacle lens substrate 1 may for instance be heated to a temperature between 40° C. and the congealing point of the applied swelling agent (compare with Table 1). The heating temperature in the specific example was about 90° C. for a time period of 60 minutes.

The heating allows for easier diffusion of the swelling agent 4 from the composition 3 into the lens material 2, i.e., the swelling agent 4 is at least a partly transferred from the composition 3 into the lens material 2. Moreover, the swelling agent 4 swells the lens material thereby causing a local increase in volume/expansion that results in the surface pattern 5.

After heating, the residual composition 3 is removed from the surface 6 of the spectacle lens substrate 1 (step S6). This may be done by wiping, e.g., with paper towels, or washing in presence of ethanol, isopropanol, acetone or any solvent that dissolves the composition 3. Rinsing may be combined with ultrasonic cleaning in an ophthalmic lens washing machine. The ultrasonic bath may be heated. To mitigate the extraction of an unknown amount of swelling agent during the cleaning step, cleaning process parameters should be chosen properly, e.g., cleaning at low temperature.

After removing the composition 3 from the surface 6, a spectacle substrate lens 1 with a surface pattern 5 (letters "MARK" in step S6) is obtained. The swelling agent 4 is diffused into the surface 6 and has swollen the lens material 2 at positions forming the surface pattern 5 as shown in the enlargement of FIG. 3. Thus, the obtained surface pattern 5 is locally-resolved.

Figure 4:
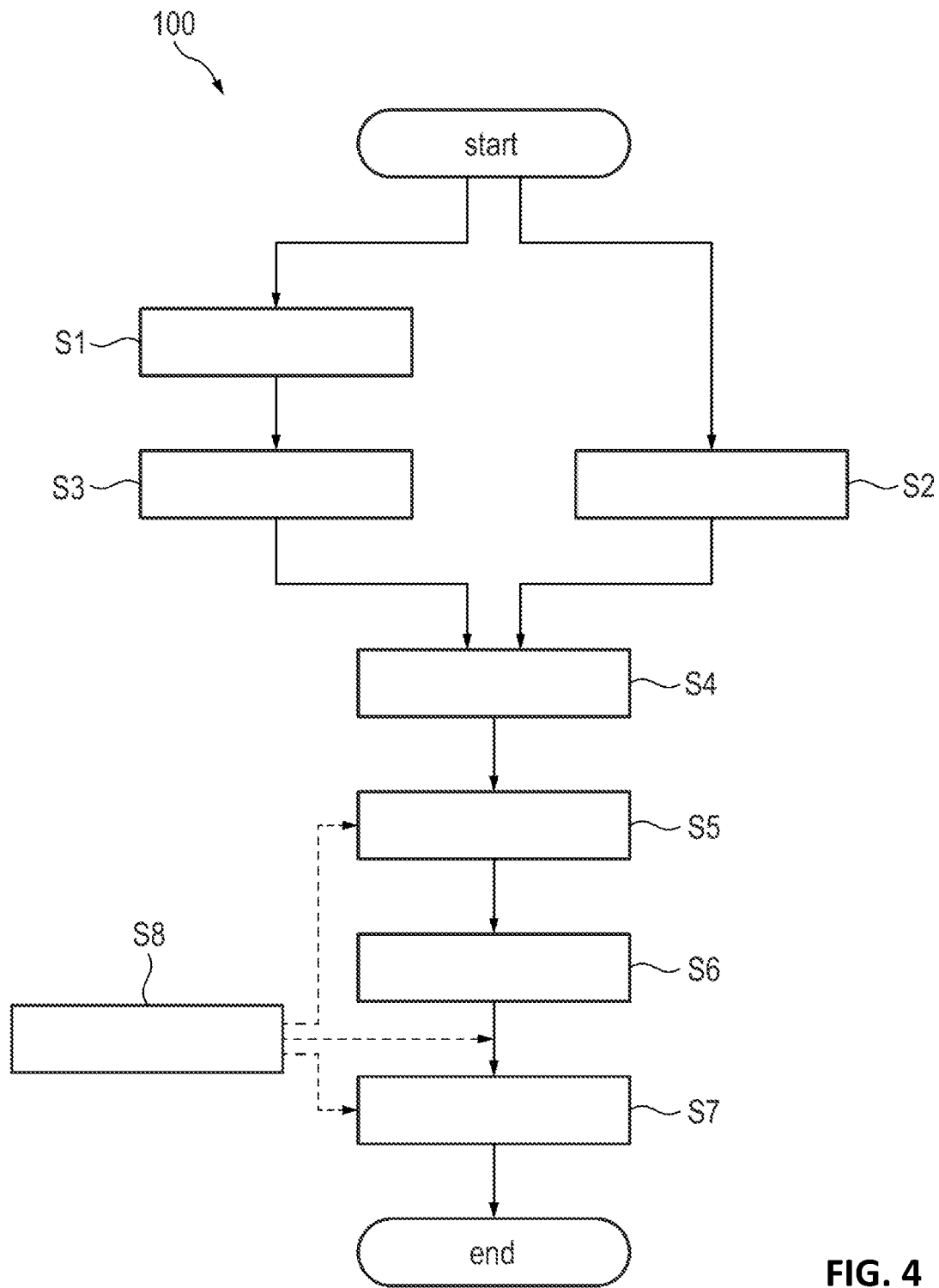
FIG. 4 is a flowchart illustrating a method for applying a surface pattern on a surface of a spectacle lens substrate.

FIG. 4 depicts a flowchart illustrating a further exemplary embodiment of a method 100 for applying a surface pattern 5 on a surface 6 of a spectacle lens substrate 1. In contrast to the method 100 described with respect to FIG. 3, this method 100 additionally comprises a polymerizing step and, optionally, the application of a coating. Otherwise, the explanations for the first exemplary embodiment (FIG. 3) can be transferred to this exemplary embodiment.

Method 100 starts with steps S1 and S2 that can be performed simultaneously or subsequently in any order. In step S1, the spectacle lens 1 is provided which comprises a polymeric lens material. In step S2, the composition 3 which comprises a swelling agent 4 is provided. The swelling agent 4 is polymerizable.

Then, an accelerating agent 8 is applied on the surface 6 of the spectacle lens substrate 1 (step S3). In step S4, a pattern 7 of the composition 3 is applied on the surface 6 of the spectacle lens substrate 1, for instance by inkjet printing. Subsequently, the swelling agent 4 diffuses from the composition 3 into the lens material 2 (step S5). To facilitate diffusion of the swelling agent 4 from the composition 3 into the lens material 2, the spectacle lens substrate 1 with the pattern 7 applied thereon is heated. The diffusion leads to local swelling of the lens material 2 at positions where the swelling agent 4 is present.

In step S6, the remaining composition 3 is removed from the surface 6 of the spectacle lens substrate 1, i.e., the surface 6 is cleaned. Optionally, in step S7, a coating is applied on the surface 6 of the spectacle lens substrate 1, e.g., an anti-reflective coating and/or a hard-coat coating, using conventional coating techniques.

Additionally, the method 100 comprises a polymerizing step S8 wherein the polymerizable swelling agent 4 is polymerized. Step S8 can be performed simultaneously with the heating of the spectacle lens substrate 1 in step S5, after removing the composition 3 from the surface 6 of the spectacle lens substrate 1 (step S6) or simultaneously with applying a coating on the spectacle lens substrate 1 in step S7. These possibilities that are combinable with each other are represented by dashed arrows in FIG. 4.

Figure 5:
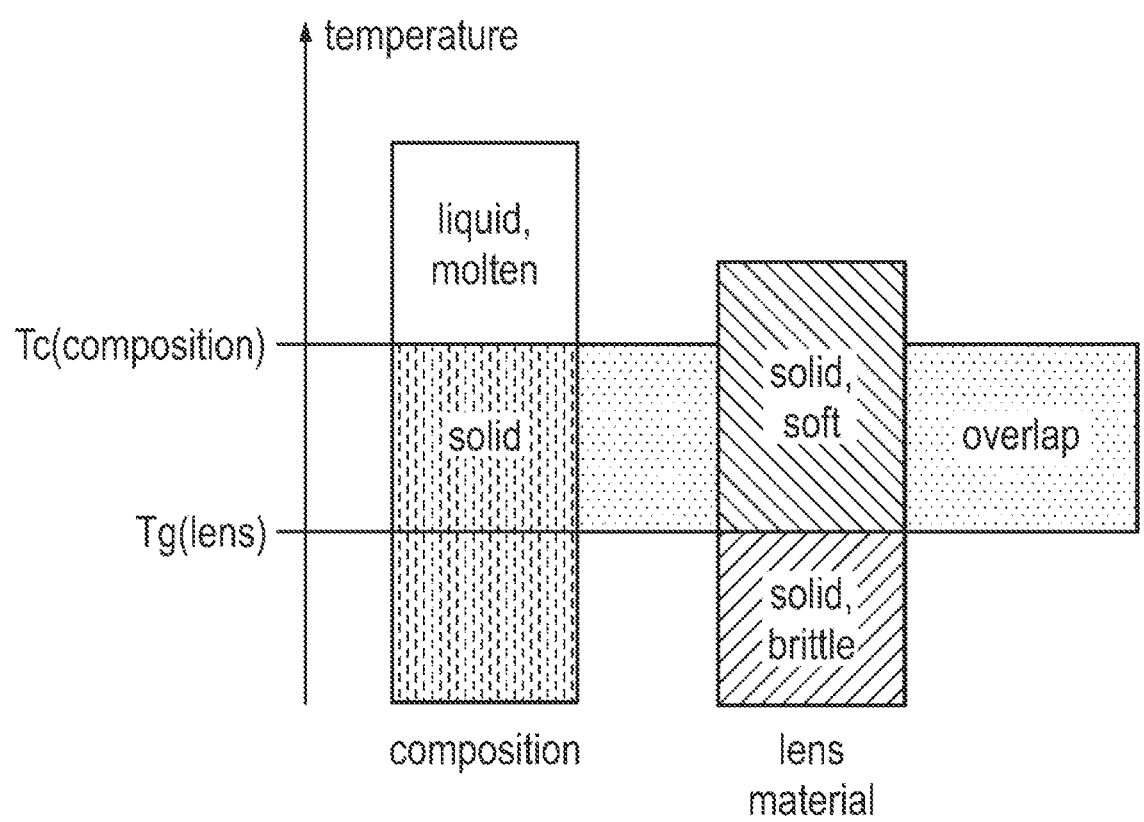
FIG. 5 illustrates the temperature-dependent physico-chemical behavior of the lens material and the composition.

FIG. 5 shows the temperature-dependent physico-chemical behavior of the lens material 2 and the composition 3 comprising the swelling agent 4. With increasing temperature, the composition 3 changes from solid state to liquid molten state above its congealing point Tc (composition). The lens material 2 likewise changes from the solid, brittle state (below its glass transition temperature Tg (lens)) to solid soft state (above its glass transition temperature Tg (lens)). At even higher temperature, the lens material 2 may melt or decompose (not shown in FIG. 5).

To allow for fast-enough diffusion of the swelling agent 4 into the lens material 2, the heating temperature should typically be above the glass transition temperature Tg (lens) of the lens material 2. Moreover, to maintain a high spatial resolution of the applied pattern 7 and thus, to obtain a surface pattern 5 with a high spatial resolution, the heating temperature should typically be below the congealing point Tc (composition) of the composition 3, i.e., within the designated "overlap" range. In addition to the phase transitions depicted in FIG. 5, further phase transitions might occur, for example due to recrystallization.

Figure 6:
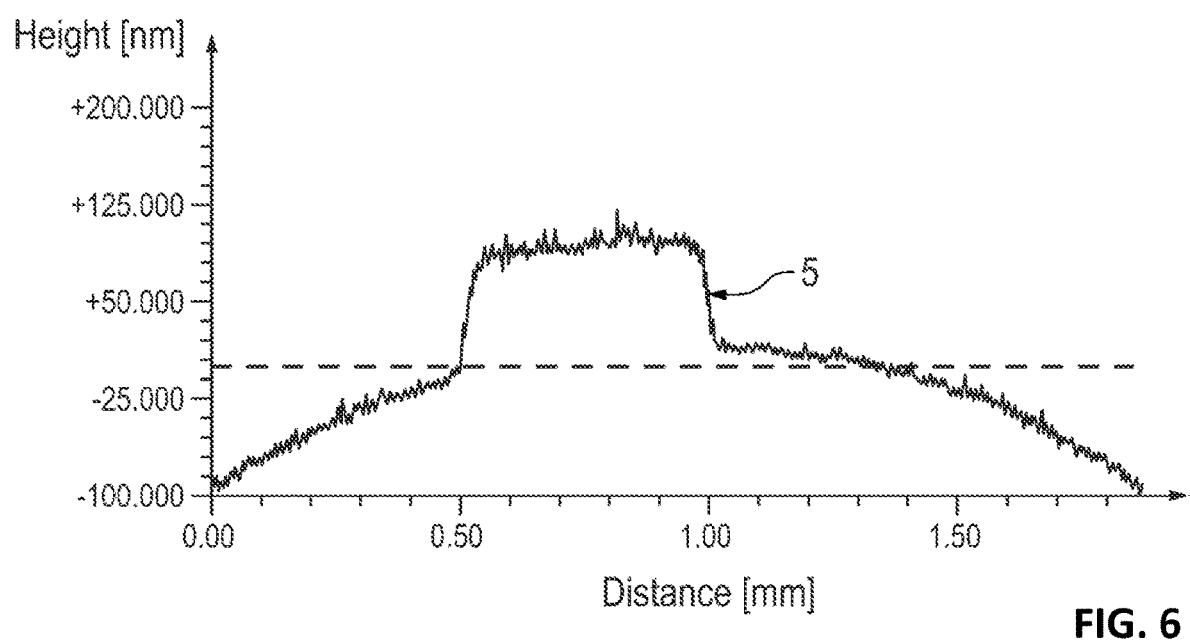
FIG. 6 shows a depth-profile of an exemplary surface pattern.

FIG. 6 shows a typical height profile of a surface pattern 5 on the surface 6 of a spectacle lens substrate 1 that consists of MR-7 obtained according to a method 100 as described with reference to FIG. 3. The height profile was obtained by white light interferometry using measuring equipment from the manufacturer Zygo (Device: WLI NewView7100, Software: Metro Pro 10). As can be seen from FIG. 6, a height increase of about 100 nm due to the swelling with the swelling agent 4 can be observed.

Figure 7A:
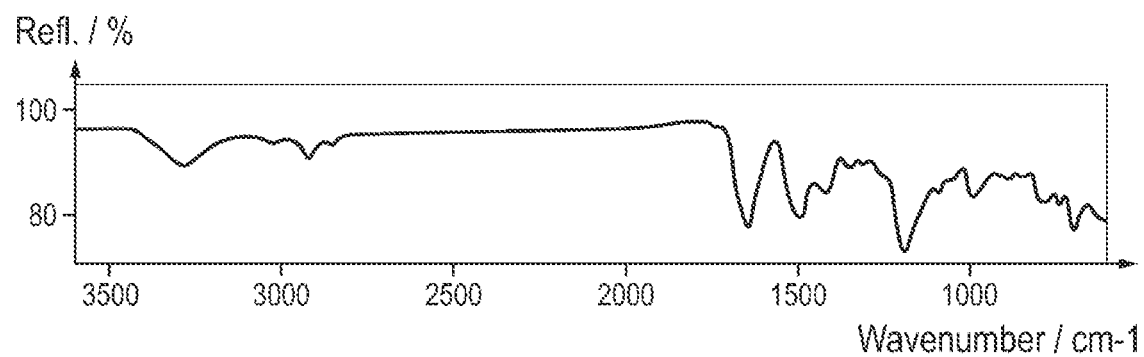
FIG. 7A shows an ATR-FTIR spectrum of the neat lens material MR-7.
Figure 7B:
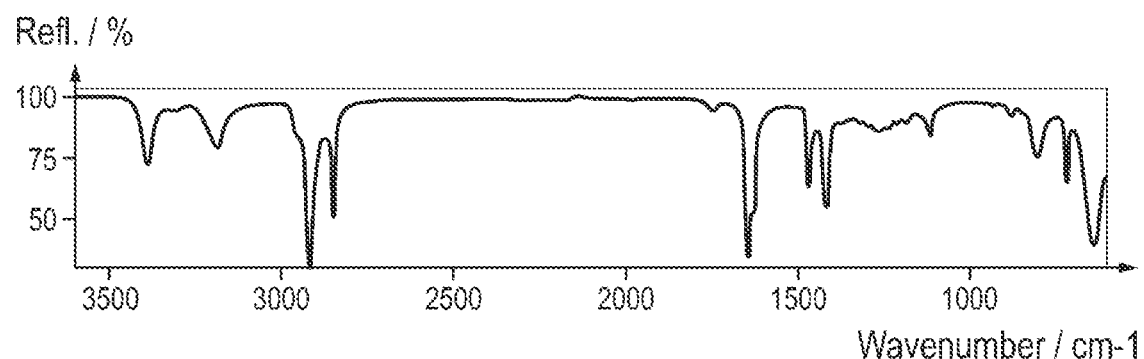
FIG. 7B shows an ATR-FTIR spectrum of the swelling agent stearamide wax A 28 P.
Figure 7C:
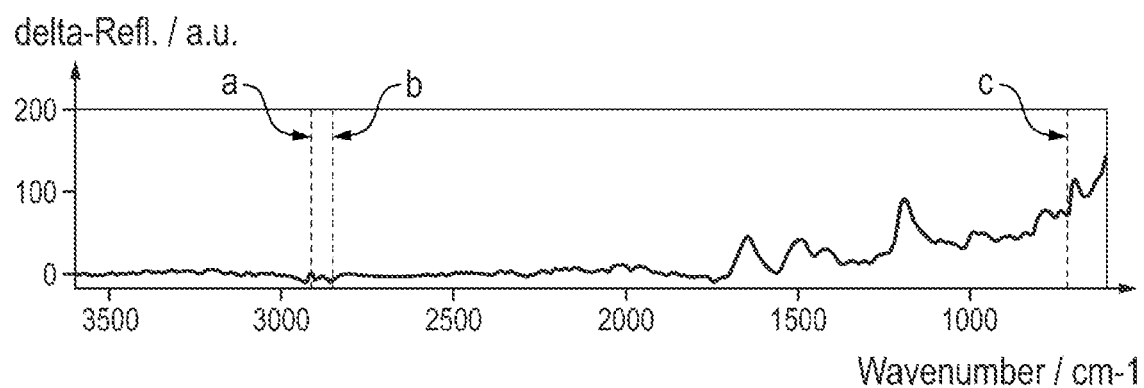
FIG. 7C shows a difference ATR-FTIR spectrum of surface-swollen MR-7 and neat MR-7.

FIGS. 7A to 7C show ATR-FTIR (attenuated total reflection Fourier-transform infrared spectroscopy) spectra of neat MR-7 (FIG. 7A) and stearamide wax A 28 P (FIG. 7B). Moreover, a difference ATR-FTIR spectrum of MR-7 swollen with A 28 P and neat MR-7 that was derived by subtracting the spectra of swollen and non-swollen spots on the very same spectacle lens substrate 1 is shown in FIG. 7C. The ATR-FTIR spectra were obtained using the surface-sensitive ATR technique with a Nicolet Is20 from the manufacturer Thermo Fisher Scientific.

ATR-FTIR spectroscopy was performed to assess the chemical composition of the surface 6 in swollen and non-swollen state. A first reference spectrum was obtained from the surface 6 of a cleaned pristine spectacle lens substrate 6 made of MR-7 (FIG. 7A). Another spectrum was collected for the swelling agent 4, microcrystalline stearamide wax (FIG. 7B). Finally, another spectrum was collected from a position (spot) that was subjected to the swelling process to obtain the difference spectrum shown in FIG. 7C.

By comparing these spectra, it is evident that the swelling agent 4 diffused into the lens material 2. The common IR bands are listed in Table 3. Thus, the swelling agent 4 induced the swelling of the lens material 2 leading to the surface pattern 5.

TABLE 3

Correlation of IR bands to chemical structures.

| Wavenumber (1/cm) | Vibrational mode | IR band in FIGS. 7A to 7C |
|---|---|---|
| 2917 | $v_{as}$ (1° Amide, N—H) | a |
| 2856 | $v_s$ (1° Amide, N—H) | b |
| 719 | $\gamma$ (O=C—NH$_2$) | c |

Figure 8:
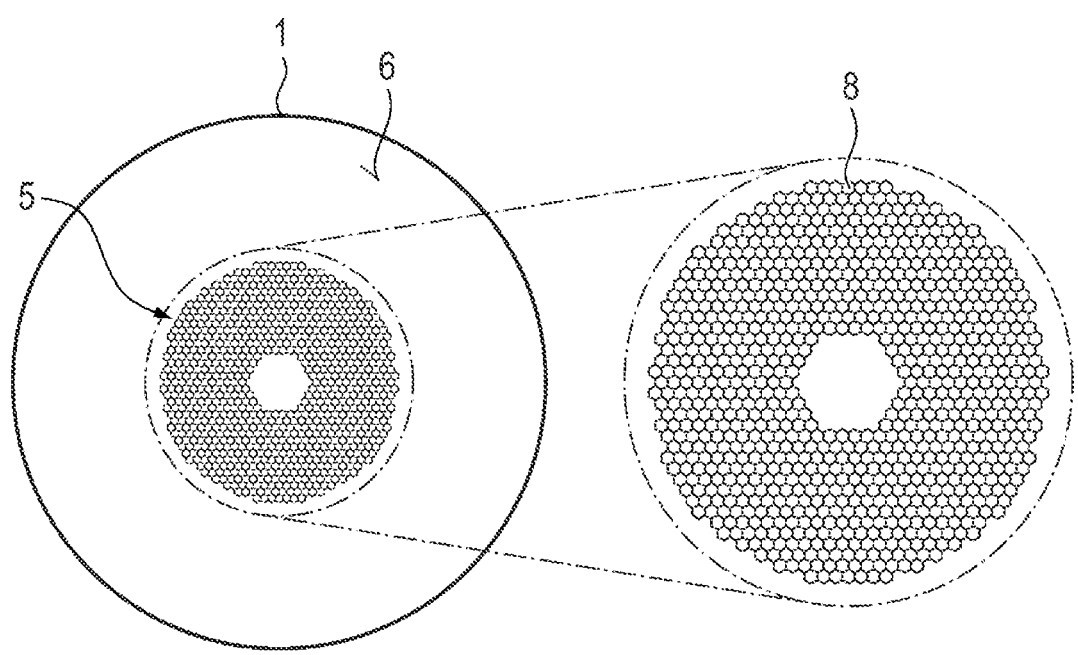
FIG. 8 shows a spectacle lens substrate with a pattern comprising optical elements.

FIG. 8 shows an exemplary spectacle lens substrate 1 with a surface pattern 5 on its surface 6. The surface pattern 5 comprises a plurality of optical elements 8 shown in the enlargement. The optical elements 8 are lenslets which are designed and arranged on the surface 6 for at least retarding progression of myopia if a spectacle lens manufactured from the spectacle lens substrate 1 is positioned relative to the eye of a wearer according to a given as-worn position. Such a spectacle lens substrate 1 with a surface pattern 5 on its surface 6 can be obtained by using A 28 P stearamide wax from the manufacturer Deurex AG as swelling agent 4 together with MR-7 as lens material 2. The swelling time should be at least 2 h at 97° C.

Typical features of the disclosure are described in the following clauses:

Clause 1. A method for applying a surface pattern on a surface of a spectacle lens substrate, the method comprising the following steps:

providing a spectacle lens substrate comprising a polymeric lens material,
providing a composition comprising a swelling agent,
applying a pattern of the composition on the surface of the spectacle lens substrate, and
heating the spectacle lens substrate to allow for diffusion of the swelling agent from the composition into the lens material.

Clause 2. The method of clause 1, wherein the method comprises:
applying an accelerating agent on the surface of the spectacle lens substrate.

Clause 3. The method of clause 1 or 2, wherein the method comprises:
removing the composition from the surface of the spectacle lens substrate.

Clause 4. The method of any one of clauses 1 to 3, wherein the method comprises:
applying a coating on the surface of the spectacle lens substrate.

Clause 5. The method of clause 4, wherein the coating is a hard-coating and/or an antireflective-coating.

Clause 6. The method of any one of clauses 1 to 5, wherein the swelling agent is polymerizable and wherein the method comprises:
polymerizing the polymerizable swelling agent.

Clause 7. The method of clause 6, wherein the swelling agent is polymerized simultaneously with the heating of the spectacle lens substrate, after removing the composition from the surface of the spectacle lens substrate or simultaneously with applying a coating on the spectacle lens substrate after removing the composition from the surface of the spectacle lens substrate.

Clause 8. The method of any one of clauses 1 to 7, wherein a congealing point of the composition is above a glass transition temperature of the lens material and wherein the spectacle lens substrate is heated to a temperature above the glass transition temperature of the lens material and below the congealing point of the composition.

Clause 9. The method of any one of clauses 1 to 8, wherein the pattern is applied by inkjet printing.

Clause 10. The method of any one of clauses 1 to 9, wherein the pattern of the composition is directly applied on the surface of the spectacle lens substrate.

Clause 11. The method of any one of clauses 1 to 10, wherein the swelling agent is at least one selected from the group of stearamide wax, paraffin waxes and hydrocarbon waxes, oxidized Fischer-Tropsch waxes, and polyethylene waxes.

Clause 12. The method of any one of clauses 1 to 11, wherein the pattern is applied and heated such that the obtained surface pattern comprises optical elements for a treatment of ametropia.

Clause 13. The method of clause 12, wherein the optical elements comprise lenslets which are designed and arranged on the surface of the spectacle lens substrate for at least retarding progression of myopia if a spectacle lens manufactured from the spectacle lens substrate is positioned relative to the eye of a wearer according to a given as-worn position.

Clause 14. The method of any one of clauses 1 to 13, wherein the lens material is CR-39, MR-8, or MR-7.

Clause 15. A spectacle lens substrate comprising a polymeric lens material and exhibiting a surface pattern on a surface of the spectacle lens substrate, wherein the polymeric lens material comprises a swelling agent at positions forming the surface pattern.

Clause 16. The spectacle lens substrate of clause 15, wherein the swelling agent is polymerized.

Clause 17. The spectacle lens substrate of clause 15 or 16, wherein the swelling agent is at least one selected from the group of stearamide wax, paraffin waxes and hydrocarbon waxes, oxidized Fischer-Tropsch waxes, and polyethylene waxes.

Clause 18. The spectacle lens substrate of any one of clauses 15 to 17, wherein the spectacle lens substrate comprises a coating hard-coating and/or an antireflective-coating applied on top of the surface pattern.

Clause 19. The spectacle lens substrate of clause 18, wherein the coating is a hard-coating and/or an antireflective-coating.

Clause 20. The spectacle lens substrate of any one of clauses 15 to 19, wherein the surface pattern comprises optical elements for a treatment of ametropia.

Clause 21. The spectacle lens substrate of clause 20, wherein the optical elements comprise lenslets which are designed and arranged on the surface of the spectacle lens substrate for at least retarding progression of myopia if a spectacle lens manufactured from the spectacle lens substrate is positioned relative to the eye of a wearer according to a given as-worn position.

Clause 22. The spectacle lens substrate of any one of clauses 15 to 21, wherein the lens material is CR-39, MR-8, or MR-7.

Clause 23. A spectacle lens substrate comprising a polymeric lens material, wherein the spectacle lens substrate exhibits a pattern of a composition comprising a swelling agent applied on a surface of the spectacle lens substrate.

Clause 24. The spectacle lens substrate of clause 23, wherein the swelling agent is polymerizable.

Clause 25. The spectacle lens substrate of clause 23 or clause 24, wherein a congealing point of the composition is above a glass transition temperature of the lens material.

Clause 26. The spectacle lens substrate of any one of clauses 23 to 25, wherein the pattern is applied by inkjet printing.

Clause 27. The spectacle lens substrate of any one of clauses 23 to 26, wherein the pattern of the composition is directly applied on the surface of the spectacle lens substrate.

Clause 28. The spectacle lens substrate of any one of clauses 23 to 27, wherein the swelling agent is at least one selected from the group of stearamide wax, paraffin waxes and hydrocarbon waxes, oxidized Fischer-Tropsch waxes, and polyethylene waxes.

Clause 29. The spectacle lens substrate of any one of clauses 23 to 28, wherein the lens material is CR-39, MR-8, or MR-7.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS 1 spectacle lens substrate
2 lens material
3 composition
4 swelling agent
surface pattern
6 surface
7 pattern
8 optical element
100 method
S1 to S8 method steps
Tc (composition) congealing point of the composition
Tg (lens) glass transition temperature of the lens material
$v_{as}$ asymmetric stretch IR band
$v_s$ symmetric stretch IR band
$\gamma$ out-of-plane twisting/wagging IR band

The invention claimed is:

1. A method for applying a surface pattern on a surface of a spectacle lens substrate, the method comprising the following steps:
   S1: providing a spectacle lens substrate having a polymeric lens material;
   S2: providing a composition containing a swelling agent, wherein the swelling agent is a substance which is capable of diffusing into the lens material and swelling the polymeric network of the lens material causing an increase in volume;
   S4: applying a pattern of the composition on the surface of the spectacle lens substrate; and
   S5: allowing for diffusion of the swelling agent from the composition into the lens material such that the swelling agent diffuses in the lens material and swells the polymeric network of the lens material causing an increase in volume.

2. The method as claimed in claim 1, wherein the step (S5) of allowing for diffusion of the swelling agent from the composition into the lens material comprises heating the spectacle lens substrate.

3. The method as claimed in claim 1, wherein the method comprises:
   S3: applying an accelerating agent on the surface of the spectacle lens substrate, wherein the accelerating agent is a substance which is capable of widening the polymeric network of the lens material.

4. The method as claimed in claim 1, wherein the swelling agent is polymerizable and wherein the method comprises:
   S8: polymerizing the polymerizable swelling agent.

5. The method as claimed in claim 4, wherein the swelling agent is polymerized simultaneously with the heating of the spectacle lens substrate, after removing the composition from the surface of the spectacle lens substrate or simultaneously with applying a coating on the spectacle lens substrate after removing the composition from the surface of the spectacle lens substrate.

6. The method as claimed in claim 1, wherein a congealing point Tc (composition) of the composition is above a glass transition temperature Tg (lens) of the polymeric lens material and wherein the spectacle lens substrate is heated to a temperature above the glass transition temperature Tg (lens) of the polymeric lens material and below the congealing point Tc (composition) of the composition.

7. The method as claimed in claim 1, wherein the pattern is applied by inkjet printing.

8. The method as claimed in claim 1, wherein the swelling agent is at least one selected from the group of stearamide wax, paraffin waxes and hydrocarbon waxes, oxidized Fischer-Tropsch waxes, and polyethylene waxes.

9. The method as claimed in claim 1, wherein the pattern is applied and heated such that the obtained surface pattern comprises optical elements for a treatment of ametropia.

10. The method as claimed in claim 9, wherein the optical elements comprise lenslets which are designed and arranged on the surface of the spectacle lens substrate for at least retarding progression of myopia if a spectacle lens manufactured from the spectacle lens substrate is positioned relative to the eye of a wearer according to a given as-worn position.

11. A spectacle lens substrate comprising a polymeric lens material and exhibiting a surface pattern on a surface of the spectacle lens substrate, wherein the polymeric lens material comprises a swelling agent at positions forming the surface pattern, and wherein the swelling agent is a substance which diffused into the lens material and swelled the polymeric network of the lens material causing an increase in volume.

12. The spectacle lens substrate as claimed in claim 11, wherein the swelling agent is polymerized.

13. The spectacle lens substrate as claimed in claim 11, wherein the swelling agent is at least one selected from the group of stearamide wax, paraffin waxes and hydrocarbon waxes, oxidized Fischer-Tropsch waxes, and polyethylene waxes.

14. The spectacle lens substrate as claimed in claim 11, wherein the surface pattern comprises optical elements for a treatment of ametropia.

15. The spectacle lens substrate as claimed in claim 14, wherein the optical elements comprise lenslets which are designed and arranged on the surface of the spectacle lens substrate for at least retarding progression of myopia if a spectacle lens manufactured from the spectacle lens substrate is positioned relative to the eye of a wearer according to a given as-worn position.

* * * * *

UNITED STATES PATENT AND TRADEMARK OFFICE
CERTIFICATE OF CORRECTION

PATENT NO. : 12,061,380 B2
APPLICATION NO. : 18/592775
DATED : August 13, 2024
INVENTOR(S) : Christian Wolff, Florian Launay and Michael Krieger It is certified that error appears in the above-identified patent and that said Letters Patent is hereby corrected as shown below:

In the Specification

In Column 2, Line 27: change "U.S. Ser. No. 10/268,050" to -- U.S. 10,268,050 --

In Column 8, Line 18: change "Tables 1" to -- Table 1 --

In Column 11, Lines 7 to 8: change "Ser. No. 10/268,050" to -- U.S. 10,268,050 --

In Column 19, Line 10, List of reference numerals: change "surface pattern" to -- 5 surface pattern --

Signed and Sealed this
Seventeenth Day of September, 2024

Katherine Kelly Vidal
*Director of the United States Patent and Trademark Office*